United States Patent
Bly, Jr.

(10) Patent No.: US 10,104,371 B2
(45) Date of Patent: *Oct. 16, 2018

(54) MEASUREMENT OF IR EMISSIONS AND ADJUSTMENT OF OUTPUT SIGNAL

(71) Applicant: DISH Technologies L.L.C., Englewood, CO (US)

(72) Inventor: Allan Richard Bly, Jr., Marietta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/847,444

(22) Filed: Dec. 19, 2017

(65) Prior Publication Data

US 2018/0109784 A1   Apr. 19, 2018

Related U.S. Application Data

(62) Division of application No. 14/333,290, filed on Jul. 16, 2014, now Pat. No. 9,883,179.

(51) Int. Cl.
*H04N 17/04* (2006.01)

(52) U.S. Cl.
CPC .................... *H04N 17/04* (2013.01)

(58) Field of Classification Search
CPC ...................................... H04N 17/00
See application file for complete search history.

(56) References Cited

U.S. PATENT DOCUMENTS

| | | | | |
|---|---|---|---|---|
| 5,818,171 A * | 10/1998 | Kim | ................ | H01J 29/003 315/8 |
| 6,104,512 A * | 8/2000 | Batey, Jr. | ........... | H04B 10/1143 340/7.54 |
| 6,359,580 B1 * | 3/2002 | Morrison | ........... | H04N 5/44543 348/731 |
| 6,389,070 B1 * | 5/2002 | Cugnini | ................ | H04N 5/211 348/569 |
| 6,577,353 B1 * | 6/2003 | Welles, II | ............ | H04B 7/0871 348/705 |
| 6,741,293 B1 * | 5/2004 | Obuchi | .................... | H04N 3/27 348/554 |
| 7,061,542 B1 * | 6/2006 | Ikeguchi | .................. | H04N 5/46 348/558 |
| 7,194,209 B1 * | 3/2007 | Robbins | ................ | H04B 10/29 398/127 |
| 7,952,648 B2 * | 5/2011 | Yamamoto | ............ | H03J 1/0066 348/731 |

(Continued)

OTHER PUBLICATIONS

U.S. Appl. No. 14/333,290, filed Jul. 16, 2014, Non-Final Rejection dated Sep. 11, 2015, all pages.

(Continued)

*Primary Examiner* — Brian Yenke
(74) *Attorney, Agent, or Firm* — Kilpatrick Townsend & Stockton LLP

(57) ABSTRACT

Various arrangements for monitoring and mitigating infrared (IR) interference from a display device are presented. IR emissions from a display device are measured the IR signaling characteristics may be adjusted to mitigate interference from the emissions. Calibration methods may be used determine display emission characteristics by displaying test patterns and video clips. Characteristics of the display patterns and video clips may be correlated to high IR emissions.

15 Claims, 11 Drawing Sheets

(56) References Cited

U.S. PATENT DOCUMENTS

| | | | | |
|---|---|---|---|---|
| 8,467,685 B2* | 6/2013 | Eber | .................. | H04B 10/1141 |
| | | | | 398/106 |
| 8,867,918 B2* | 10/2014 | Nakamura | ............. | G08C 23/04 |
| | | | | 398/106 |
| 9,172,463 B2* | 10/2015 | Eber | .................. | H04B 10/1143 |
| 9,191,691 B2* | 11/2015 | Hobrock | ................ | G08C 23/04 |
| 9,883,179 B2 | 1/2018 | Bly | | |
| 2004/0103443 A1* | 5/2004 | Kuznetsov | ............. | G08C 23/04 |
| | | | | 725/132 |
| 2005/0047794 A1* | 3/2005 | Quintanar | ............. | G08C 23/04 |
| | | | | 398/149 |
| 2005/0053378 A1* | 3/2005 | Stanchfield | ........ | H04B 10/1143 |
| | | | | 398/115 |
| 2007/0085934 A1* | 4/2007 | Takagi | ................. | H04N 5/4403 |
| | | | | 348/734 |
| 2008/0148307 A1* | 6/2008 | Nielsen | .................. | H04H 60/32 |
| | | | | 725/9 |
| 2008/0309641 A1* | 12/2008 | Harel | .................... | G06F 3/0418 |
| | | | | 345/173 |
| 2009/0245803 A1* | 10/2009 | Garner | .................. | G08C 23/04 |
| | | | | 398/106 |
| 2009/0245804 A1* | 10/2009 | Garner | .................. | G08C 23/04 |
| | | | | 398/106 |
| 2011/0025453 A1* | 2/2011 | Kozlowski | ............. | G08C 17/02 |
| | | | | 340/3.1 |
| 2011/0037636 A1* | 2/2011 | Alexander | ............. | G08C 23/04 |
| | | | | 341/176 |
| 2011/0150483 A1* | 6/2011 | Eber | ...................... | G08C 23/04 |
| | | | | 398/106 |
| 2011/0244802 A1* | 10/2011 | Kozlowski | ............. | G08C 17/02 |
| | | | | 455/66.1 |
| 2012/0087671 A1* | 4/2012 | Eber | .................. | H04B 10/1143 |
| | | | | 398/106 |
| 2013/0021478 A1* | 1/2013 | Hobrock | ................ | G08C 23/04 |
| | | | | 348/177 |
| 2013/0147929 A1* | 6/2013 | Irie | ........................ | H04N 17/04 |
| | | | | 348/54 |
| 2013/0293726 A1* | 11/2013 | Armstrong-Muntner | .................... | |
| | | | | G01M 11/005 |
| | | | | 348/187 |
| 2013/0321645 A1* | 12/2013 | Cashin | .................. | H04N 17/00 |
| | | | | 348/189 |
| 2014/0009505 A1* | 1/2014 | Moon | ..................... | G09G 5/10 |
| | | | | 345/690 |

OTHER PUBLICATIONS

U.S. Appl. No. 14/333,290, filed Jul. 16, 2014, Final Rejection dated Feb. 17, 2016 all pages.

U.S. Appl. No. 14/333,290, filed Jul. 16, 2014, Non-Final Rejection dated Jun. 15, 2016, all pages.

U.S. Appl. No. 14/333,290, filed Jul. 16, 2014, Final Rejection dated Oct. 17, 2016 all pages.

U.S. Appl. No. 14/333,290, filed Jul. 16, 2014, Non-Final Rejection dated Mar. 7, 2017 all pages.

U.S. Appl. No. 14/333,290, filed Jul. 16, 2014, Final Rejection dated Jul. 5, 2017 all pages.

U.S. Appl. No. 14/333,290, filed Jul. 16, 2014, Notice of Allowance dated Oct. 31, 2017 all pages.

* cited by examiner

UP directivity

Centered

Left Directivity

Right directivity

MEASUREMENT OF IR EMISSIONS AND ADJUSTMENT OF OUTPUT SIGNAL

CROSS-REFERENCE TO RELATED APPLICATIONS

The present application is a divisional of U.S. patent application Ser. No. 14/333,290, filed Jul. 16, 2014, entitled "MEASUREMENT OF IR EMISSIONS AND ADJUSTMENT OF OUTPUT SIGNAL," the contents of which are incorporated herein by reference, in their entirety.

BACKGROUND

A remote control is often used to remotely send command or instructions to devices such as stereos, televisions, television receivers, and other devices. The remote control may send commands using an infrared (IR) signal. Modulations or changes in the infrared signal intensity, frequency, and/or the like, may be used to transfer information and commands from the remote to the devices.

In some environments, the infrared signaling may be disrupted or affected by infrared emissions from other devices. Display devices such as televisions and monitors, for example, may emit infrared energy. The infrared energy emitted by the display devices may be a byproduct of the operation of the display. The infrared energy emitted by a display device may interfere with the operation of the remote control and may cause the remote to be inoperative.

Thus what is needed are methods and systems for mitigating the disruptions to infrared communications to and from a remote control due to emissions of IR energy from other devices.

SUMMARY

In some embodiments, a television receiver configured to mitigate IR interference from a display device is presented. The television receiver may include one or more processors and a memory communicatively coupled with and readable by the one or more processors and having stored therein processor-readable instructions. When executed by the one or more processors, the instructions may cause the one or more processors to initiate a calibration mode and generate test patterns for display on the display device, the test patterns may be configured to induce infrared (IR) emissions from the display device. The instructions may further cause the one or more processors to measure IR emissions during the display of the test patterns and determine IR emission characteristics. IR configuration based at least in part based on the IR emission characteristics may be determined. The configuration may include settings for IR signaling that is configured to mitigate interference from the IR emissions. The instructions may further cause the one or more processors to initiate the IR configuration.

In embodiments, the processor-readable instructions, when executed, may further cause the one or more processors to receive IR signals during the calibration mode and determine error rates of the IR signals. The processor-readable instructions, when executed, may also further cause the one or more processors to adjust the IR configuration to reduce the error rates. In some embodiments the IR settings may be optimized to reduce power needed for IR signaling. In some embodiments the IR configuration may include IR power level settings or IR signal encoding settings. The processor-readable instructions, when executed, may further cause the one or more processors to correlate IR emissions with specific patterns displayed on the display device.

In some embodiments a method for mitigating IR interference from a display device is presented. The method may include initiating a calibration mode and generating test patterns for display on the display device. The test patterns may be configured to induce infrared (IR) emissions from the display device. The method may further include measuring IR emissions during the displaying of the test patterns and determining IR emission characteristics. The method may include determining an IR configuration based at least in part based on the IR emission characteristics and initiating the IR configuration.

In some embodiments a non-transitory processor-readable medium for mitigating IR interference from a display device is presented. The medium may include processor-readable instructions configured to cause one or more processors to initiate a calibration mode and generate test patterns for display on the display device. The test patterns may be configured to induce infrared (IR) emissions from the display device. The medium may include processor-readable instructions configured to cause one or more processors to measure IR emissions during the display of the test patterns and also determine IR emission characteristics. The medium may include processor-readable instructions configured to cause one or more processors to further determine an IR configuration based at least in part based on the IR emission characteristics and initiate the IR configuration.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
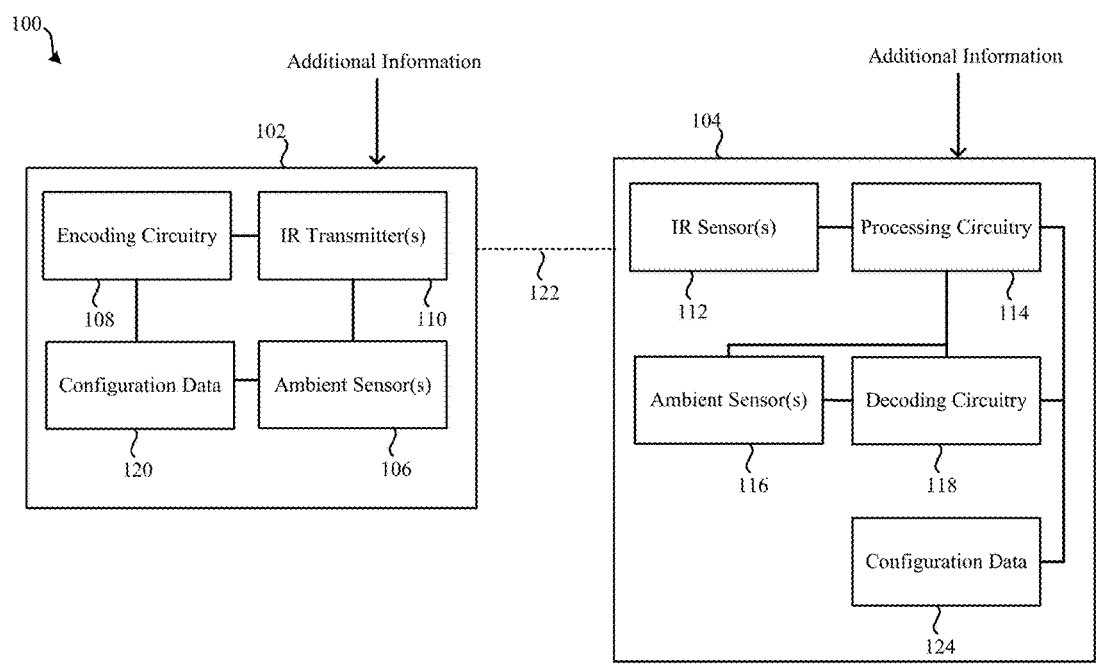
FIG. 1 illustrates an embodiment of an infrared communication system.

Remote controls often use an infrared (IR) signal to send and/or receive command, information, and/or instructions to devices such as stereos, televisions and set-top boxes. Information between the remote and the devices may be transmitted by encoding the data using the IR signal. Modulations or changes in the IR signal intensity, frequency, wavelength, phase, and/or the like may be used to encode information. Receiving devices may monitor changes to the IR signal and decode the changes in amplitude, frequency, intensity, and the like to determine transmitted commands or information.

In some environments, the IR signal may be disrupted or affected by infrared emissions from other devices. Display devices, such as televisions and monitors, for example, may emit infrared energy. The additional infrared energy emitted by a display device may affect the decoding of the IR signal.

Display devices may generate different IR emissions depending on the type of display device, the activity on the display device, ambient conditions and/or the like. For some types of display devices the IR emissions may be broadband and may be continuously emitted by the device. For some types of display devices the IR emissions may be periodic or manifest in temporary bursts. In some cases the emissions may occur only at specific times such as only when a display device is warming up or displaying specific images and colors. IR emissions may be different for each type of display or may depend on the backlight technology of the display. For example, a plasma television display may generate different IR emissions than a LED backlit television.

An IR remote control is often used to remotely send commands or instructions to set-top boxes (STB) and television receivers. STBs may be positioned near different displays that may generate IR emissions that may interfere with the IR remote control. A STB and remote may be paired with many different models/types of display devices. Each display device may emit a different IR interference pattern. The relative position of the IR emitting display device, the IR receiver, the orientation between the remote and the receiver may be different for each set-top installation. An STB and the remote control must be able to cope with many different IR emission and interference characteristics.

In embodiments, the IR communication system may include methods, procedures, and modules for mitigating or reducing the effects of IR interference due to IR emissions from display devices. Methods and systems may be configured and/or adaptable to different emission sources, orientations, positions of system components and display devices.

In some embodiments, the STB and the IR remote may include a calibration and/or IR signal testing capability. The calibration and/or IR signal testing capability may be used determine the characteristics of the IR emissions from the display devices. The calibration and/or the IR signal testing capability may be used to determine the interference characteristics caused by the display. In some embodiments, calibration and testing may be automated. In some embodiments, calibration and testing may require user input. Calibration and testing may include transmitting IR signals from the remote to the STB in the presence of IR emissions from the display. Calibration and testing may include receiving readings from sensors. Calibration and testing may be used to adjust the position of system components, adjust parameters of IR signals, and/or adjust parameters of IR receivers to reduce the effects of IR emissions.

Calibration and IR signal testing may be initiated by the user by initiating a calibration and test option at the STB. During the calibration phase a user may be prompted to press specific buttons on the remote to transmit known commands or messages to the receiver. The user may be prompted with visual or audio indicators that may be displayed on the display device. The IR receiver may compare the received messages to the expected messages based on the user prompts and determine the error characteristics of the IR signal. The IR receiver may analyze the received message to determine the error rates, types of errors (unidirectional, burst, etc.). Based on the error characteristics the IR receiver may adjust filter parameters, decoding parameter, IR signal power output, and the like. After adjustments the user may be prompted to push buttons or provide additional input to determine if the message reliability has improved.

Calibration and IR signal testing may be initiated automatically by the system when received IR signals have high error rates. An automated test sequence may be transmitted automatically between system elements without requiring user input. The remote may store a sequence of pre-determined test messages and commands. A user may be prompted to position the remote in a typical use location and press or hold one or more button on the remote to initiate transmission of the test sequence. The test messages sent from the remote control may be encoded using different error control codes, protocols and the like. The test messages may be configured to test the reliability and performance of each setting. An IR receiver may analyze the error characteristics of the test messages and select an appropriate encoding and protocol. An appropriate encoding may be an encoding that minimizes the error rate. In some cases, an appropriate encoding may be an encoding that provides adequate reliability at the lowest power level.

A remote control may be able to receive data via another communication channel or a "back channel". The remote control may be coupled with an RF communication capability, may be connected via a wire or other reliable back channel. The system may use the back channel to cause the remote to send messages automatically to the receiver without user input, the user may be prompted to position the remote in a typical use location and aimed at the receiver. The back channel may be used to configure the remote with a test sequence and configure appropriate error control, encoding, and protocol options.

During calibration and signal testing, a user may be provided with indications regarding the characteristics of the IR signal. A user may be prompted to make adjustments to the position, orientation, and the like of the television receiver relative to the display device to reduce the interference. During the calibration, real time performance characteristics of the IR signal may be presented to the user. The user may be prompted to make position adjustments to components of the system. As the user makes the adjustments the effects of the adjustments may be displayed on the display device or other indicators. In some embodiments, the characteristics of the interference patterns may be used to adjust the protocols used for transmission, the parameters of amplifiers, and/or decoders and encoders used for transmitting and receiving the IR signals.

Protocols and other characteristics of the IR signals may be adjusted based on the performance (e.g. error rates) of the test messages. The receiver may select encoding based on codes related to the error characteristics observed in the test messages. For example, if burst errors are observed during the transmission or test messages encodings based on error control codes designed for burst errors may be selected. Encoding may include Reed Solomon codes, constant weight codes, Hamming codes, replication codes, and/or the like.

In some embodiments, the IR signaling protocol may be configured to retransmit the same command or information multiple times. If the IR emissions from a display device occur in bursts, for example, then it is likely that the noise will not affect all transmissions of the same command. The retransmission strategy including the number of retransmissions, the timing of the retransmissions may be configured based on the characteristics of the IR emissions. The retransmission strategy may be selected such that the time required to transmit all of the copies of the same message is longer than the interference burst to avoid the interference affecting all of the copies of the same message.

An IR receiver may receive the multiple copies of the messages sent by the remote control and compare or analyze the multiple copies to determine the correct message. For example, the receiver may average the multiple messages or perform a voting or comparison operations.

Calibration and testing may include monitoring ambient or background IR emissions. IR receiver sensors may be used to measure IR emissions. In some embodiments, dedicated sensors may be used to monitor ambient IR emissions from a display device. Measured characteristics of IR emissions from a display device may be used to adjust the protocols used for transmission, the parameters of amplifiers, and/or decoders and encoders used for transmitting and receiving the IR signals. For example, based on the frequency content of the background IR emissions, filters in the IR receiver may be adjusted to filter the noise content from the received signal. In another example, the calibration and signal testing may be used to determine the temporal characteristics of the emitted IR signals. The IR receiver may monitor the background IR emissions during the operation of the display device. The IR receiver may determine if the IR emissions are continuous, occurs in bursts, or are correlated with specific activity of the display device.

In some embodiments, IR emissions from a display device may have predictable characteristics that may be correlated to the model and/or type of the display device. A database of known display devices and their IR emission characteristics may be maintained at the television receiver or a remote location such as at the service provider. The database may include IR configurations for each model or type of display device that have been tested or determined to be appropriate.

A STB may automatically detect the display model and identify an appropriate IR configuration data for the display. Alternatively, a user may be prompted to enter the display model. Based on the display model the appropriate configuration may be selected from the database. If the STB does not have a preloaded configuration for the display model or type the display, the STB may query the service provider or other internet resources for appropriate configurations. In some embodiments, the configurations may be determined based on the display type, size, backlight technology (i.e., florescent, light emitting diode (LED), etc.), manufacturer, and/or the like.

For some display devices, IR emissions from the display may be correlated or related to the images displayed on the display and/or the activity of the display. For example, for some display devices the IR emission may depend on the brightness of the display or the color of the image shown on the display. An image with mostly white colors may, in some displays, correspond to higher IR emissions than an image with mostly black colors. Likewise, for some displays, rapidly changing colors or screens may result in increased IR emissions.

Calibration may include an analysis and correlation of the IR emissions and displayed images and/or display activity. A STB may include a calibration mode which includes a series of test image patterns or test video clips to display on the display device during calibration. The test patterns and/or the video clips may be designed to exercise or generate a wide range of outputs on the display device. The test patterns and/or the video clips may be configured to cause different IR emissions from the display. The test patterns may include images with different colors, hues, saturations, and the like. The video clips may include rapidly changing images and slow changing images. The test patterns and/or the motion video may be looped to continuously play during the calibration operations. Test patterns and video clips may be adaptively generated during the calibration process based on sensor readings. In some cases the set-top box may be able to adjust the TV directly via wireless, Ethernet, IR Blast, HDMI CEC etc.

During the calibration operation, test patterns and/or motion video may be shown on the display device. During this time, an IR receiver may monitor the IR emissions of the display device. The sensor readings may be correlated to the types or patterns, images, colors, video, and the like displayed on the display device. The IR emission intensity, frequency, characteristics, and/or the like may be recorded for each test pattern, color, image, video clip, and/or the like. For example, during a portion of the calibration, a test pattern with changing colors may be displayed. During the display of the test pattern the intensity, magnitude, frequency, and other characteristics of the IR energy sensed at the receiver sensors may be captured and recorded for each of the characteristics of the test pattern.

After the sensor readings have been collected for different test images, video clips, and patterns, the readings may be analyzed to determine display conditions that result in high IR emissions from the display device. Occurrences of high IR emissions may be analyzed for specific colors, images, display activity, and/or the like. In embodiments the television receiver may analyze and establish thresholds or guidelines as to the types of display activity, colors, or images that may generate high IR emissions that may be high enough to disrupt remote control communications.

Test patterns and test video clips may be displayed by the display device during transmission of IR signals from the remote control. Commands and information may be transmitted from the remote control to the IR receiver using the IR channel. Errors and/or error patterns in the received messages may be analyzed and correlated to the types of images, colors, video and/or the like that were being displayed on the display device when the errors occurred. High error rates may be representative of high IR emissions from the display device. The characteristics of the images and/or video which caused high errors rates during transmission may be recorded.

In some embodiments, normal programming from one of the tuners may be shown on the display device during calibration. The characteristics of the images, video, and the like of the programming may be analyzed during periods of high IR emissions detected at the IR receiver and/or during periods of high error rates in messages sent from the remote control. A tuner and/or processor in the television receiver may analyze the characteristics of the images and video displayed. The tuner may determine correlations between image and video characteristics and IR emissions. A tuner and/or processor in the television receiver may analyze the characteristics of the images and video displayed and determine characteristics of the images and video that cause or may cause disruption to IR communication from the remote.

During normal operation of the system by a user, the image and video programming accessed and viewed on the display device by the user may be analyzed for characteristics that have been shown to be correlated with high IR emission or high error rates. The television receiver may use one or more inactive tuners to scan and analyze displayed programming for image and video characteristics and signal the IR receiver when characteristics that may result in high IR emissions or high error rates are detected. The IR receiver may use the threshold or characteristic information to improve the reliability of the communication.

For example, in a data transfer protocol that involves retransmission of the same message three times in series, video characteristics may be used to determine which copy of the transmitted message is the most likely to be accurate or error free. During the transmission of the three copies of the same message, the image and video characteristics of the images displayed on the display device may be analyzed. The characteristics may be compared to the thresholds and characteristics determined during the calibration phase to determine if the images or display activity was correlated or similar to the characteristics that resulted in high error rates or high IR emissions from the display. The copies of the message that were transmitted during the time for which an indication of high IR emissions was received may be discarded or processed differently by the IR receiver. If one of the messages was received during display activity correlated with high IR emissions the copy of the message may be ignored and the other messages used for decoding.

In embodiments, display activity correlated to high IR emissions may be used by the IR receiver to adjust decoding operations. Decoding thresholds and error detection and/or correction algorithms may be adjusted. For messages that are transmitted during display activity correlated to high IR emissions, the decoding effort may be increased. In the case of multiple transmissions of the same message copy, the timing of high IR emissions may be correlated to transmission of a specific copy or bits of the message. The bits of the each copy that are likely subject to corruption may be determined. The bits of a message that are likely corrupted may be compared to other copies to determine a correct message.

In embodiments, the images and video from programming may be analyzed by the STB prior to being displayed on the display device. The indication of characteristics correlated to the high IR emissions may be generated and provided to the IR receiver prior to the images being displayed. In some embodiments, an indication of likely high IR emissions may be generated milliseconds or even seconds before the corresponding images are displayed on the display device. The indication may be transmitted to the IR receiver and/or the remote. The IR receiver may proactively adjust the characteristics of decoding operations, demodulators, amplifiers and detectors according to the expected IR emissions. For example, the IR receiver gain can be reduced or adjusted prior to the potential interference to prevent saturation from a strong interference. In another example, the magnitude of potential IR emissions may be estimated and may be to subtracted from a received signal prior to demodulation.

In some embodiments, an IR receiver may include multiple IR sensors, ambient light sensors, and/or the like. IR sensors may be positioned at different orientations or locations on the television receiver. In some embodiments the sensors may be configured or configurable to receive and process messages from the remote control. Readings from the sensors may be subtracted, added, or otherwise combined to generate one or more combined sensor outputs. The sensor readings may be combined to reduce interference noise, for example. In some embodiments the sensor with the lowest noise component may be selected and used for receiving and decoding the signal. The IR receiver may periodically or continuously monitor the IR emissions and interference on each sensor and select a sensor with the lowest noise as the primary sensor from which the readings are processed and decoded.

In some embodiments, the sensitivity, signal filtering, and the like may be the same or different for each sensor. The sensor may be strategically positioned at different angles, or locations of the television receiver to reduce the impact of the IR emissions from the display device. Some sensors may be configured and positioned to primarily sense the ambient IR emissions. The sensors may be used to adjust the decoding and signal processing circuitry of other sensors based on the recorded emissions.

FIG. 1 shows an embodiment of an IR communication system 100 for transmitting information and command from a remote control 102 to a receiver 104 that may be integrated into a satellite television receiver. The remote control 102 may transmit signals using an IR transmitter 110. The transmitter may be IR diode or other IR emitter. The signals for IR transmission may be generated by encoding circuitry 108 which may encode commands and messages to be transmitted using an IR signal 122. The encoding circuitry may include analog circuitry and/or digital circuitry and may include amplifiers, converters, modulators, and/or the like. The encoding of information by the encoding circuitry 108 may be controlled or governed by configuration data 120. Configuration data may include rules and preferences for encoding the information, power output of the IR transmitter, protocol requirements, and/or the like. The configuration data 120 may include various alternative configurations for configuring the IR transmitter and/or the encoding circuitry. The configuration data may be manually or automatically selected from the various configurations. In some embodiments a configuration may be selected by a user or operator of the remote. In other embodiments a configuration may be automatically selected based on received information. Additional information may be received from sensors 106 such as ambient light sensors, IR sensors, or other sensors. Based on the information received from the sensors a configuration may be selected. In some embodiments the remote 102 may include additional communication channels for receiving additional information which may be used to select a configuration, update a configuration and/or the like. The additional communication channel may be an IR data channel, radio frequency data channel, or even a wired data channel. The IR data channel may, for example be bidirectional.

A bidirectional IR data channel may, for example, be configured to be an echo channel. A system with a bidirectional IR channel may be configured to receive IR messages from a remote and retransmit the message back to the remote (echo the message). The received echo may be compared to the transmitted message and if the echo does match the original message, the remote 102 may be configured to resend the message to the receiver 104.

The receiver 104 may be configured to receive and/or transmit IR signals to and from the remote 102. The receiver may include an IR sensor 112 such as an photodiode or the like. The IR sensor 112 may generate electrical signals that are related to the IR energy received by the sensor. The electrical signals may be analyzed and processed by the processing circuitry 114 which may include analog and/or digital circuitry and include filters, demodulators, gain control circuitry, and/or the like. The output of the processing circuitry 114 may be used by the decoding circuitry 118 to decode the message, perform error correction, and relay the message to appropriate elements of a television receiver. The decoding of information by the processing circuitry 114 and decoding circuitry 118 may be controlled or governed by configuration data 124. Configuration data 124 may include rules and preferences for decoding the information, filter settings of the processing circuitry, protocol requirements, and/or the like. The configuration data 124 may include various alternative configurations for configuring the IR transmitter and/or the encoding circuitry. The configuration data may be manually or automatically selected from the various configurations. In some embodiments a configuration may be selected by a user or operator. In other embodiments a configuration may be automatically selected based on received information. Additional information may be received from sensors 116 such as ambient light sensors, IR sensors, or other sensors.

Figure 2:
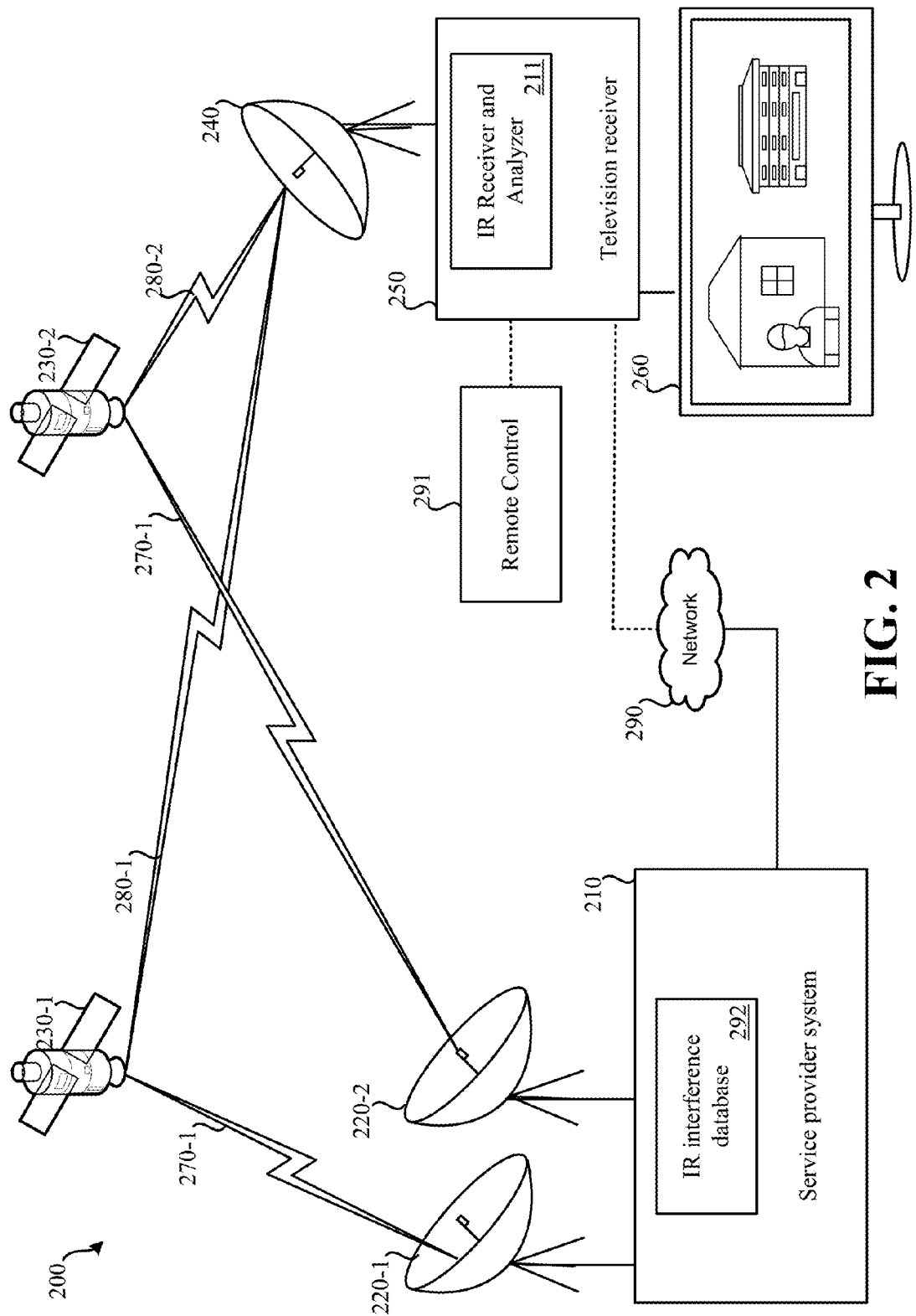
FIG. 2 illustrates an embodiment of a satellite television distribution system

The IR communication system 100 may be part of a satellite based television system. An embodiment of a satellite distribution system is illustrated in FIG. 2. Satellite television distribution system 200 may include: television service provider system 210, satellite transmitter equipment 220, satellites 230, satellite dish 240, television receiver 250, and display device 260. Alternate embodiments of satellite television distribution system 200 may include fewer or greater numbers of components. While only one satellite dish 240, television receiver 250, and display device 260 (collectively referred to as "user equipment") are illustrated, it should be understood that multiple (e.g., tens, thousands, millions) instances of user equipment may receive television signals from television service provider system 210 via satellites 230.

Television service provider system 210 and satellite transmitter equipment 220 may be operated by a television service provider. A television service provider may distribute television channels, on-demand programming, programming information, and/or other content/services to users. Television service provider system 210 may receive feeds of one or more television channels from various sources. To distribute television channels for presentation to users, feeds of the television channels may be relayed to user equipment via multiple television distribution satellites. Each satellite may relay multiple transponder streams. Satellite transmitter equipment 220 (220-1, 220-2) may be used to transmit a feed of one or more television channels from television service provider system 210 to one or more satellites 230.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams.

Satellite dish 240 may be a piece of user equipment that is used to receive transponder streams from one or more satellites, such as satellites 230. Satellite dish 240 may be provided to a subscriber for use on a subscription basis to receive television channels provided by the television service provider system 210, satellite transmitter equipment 220, and/or satellites 230.

Figure 3:
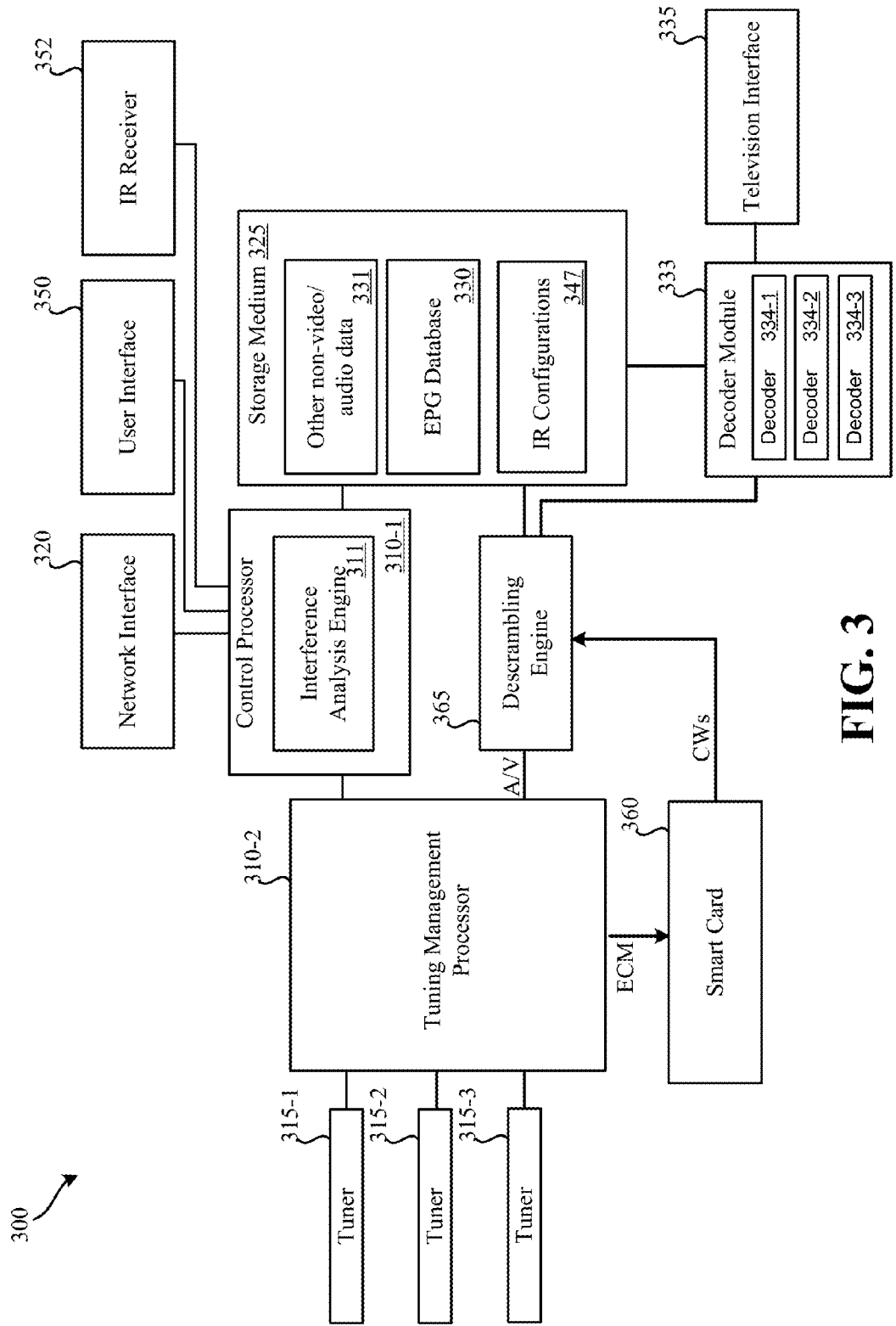
FIG. 3 illustrates an embodiment of a television receiver configured to analyze IR signals.

In communication with satellite dish 240 may be one or more television receivers. Television receivers may be configured to decode signals received from satellites 230 via satellite dish 240 for output and presentation via a display device, such as display device 260. A television receiver may be incorporated as part of a television or may be part of a separate device, commonly referred to as a set-top box (STB). Television receiver 250 may decode signals received via satellite dish 240 and provide an output to display device 260. FIG. 3 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 2 illustrates an embodiment of television receiver 250 as separate from display device 260, it should be understood that, in other embodiments, similar functions may be performed by a television receiver integrated with display device 260.

Network 290 may serve as a secondary communication channel between television service provider system 210 and television receiver 250. However, in many instances, television receiver 250 may be disconnected from network 290 (for reasons such as because television receiver 250 is not configured to connect to network 290 or a subscriber does not desire or cannot connect to network 290). Via such a secondary communication channel, bidirectional exchange of data may occur. As such, data may be transmitted to television service provider system 210 from television receiver 250 via network 290. Data may also be transmitted from television service provider system 210 to television receiver 250 via network 290. Network 290 may be the Internet. While audio and video services may be provided to television receiver 250 via satellites 230, feedback from television receiver 250 to television service provider system 210 may be transmitted via network 290.

The television receiver 250 may be controlled by a remote control 291. The remote control may send command to the television receiver using IR signaling. The remote control 291 may include an IR transmitter 102 The television receiver may include an IR receiver and analyzer 211. The IR receiver and analyzer may include the IR receiver 104 components. The remote control 102 may be used to send commands or messages to the television receiver. Commands and messages may include commands to change channel, navigate menus, configuration information, and the like.

Display device 260 may be used to present video and/or audio decoded and output by television receiver 250. Television receiver 250 may also output a display of one or more interfaces to display device 260, such as an electronic programming guide (EPG). In many embodiments, display device 260 is a television. Display device 260 may also be a monitor, computer, or some other device configured to display video and, possibly, play audio.

The display device may generate IR emissions and disrupt the IR communication between the remote control and the television receiver. In embodiments, the IR receiver and analyzer 211 may detect the type of display and/or monitor the IR emissions from the display. Based on the display type and/or detected IR emissions the configurations of the IR receiver and analyzer 211 may be adjusted or changed. In some embodiments, the IR monitoring data may be transmitted to the service provider 210 via a network 290 for analysis or storage for later analysis in the IR interference database 292. The database 292 may include IR transmitter and receiver configurations that may be downloaded by the television receiver and used to configure the remote control and/or the IR receiver for a specific television model or type.

FIG. 3 illustrates an embodiment of television receiver 300. Television receiver 300 may be configured to monitor and diagnose programming streams disruptions and output notifications. Television receiver 300 may be in the form of a separate device configured to be connected with a display device, such as a television. Embodiments of television receiver 300 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 300 may represent television receiver 250 of FIG. 2 and may be in the form of an STB that outputs video and/or audio to a display device, such as a television. Television receiver 300 may be incorporated as part of a television, such as display device 260 of FIG. 2. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, user interface 350, smartcard 360, and/or descrambling engine 365. In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2.

Processors 310 may include one or more specialized and/or general-purpose processors configured to perform processes such as tuning to a particular channel, accessing and displaying EPG information from EPG database 330, and/or receiving and processing input from a user. For example, processors 310 may include one or more processors dedicated to decoding video signals from a particular format, such as MPEG, for output and display on a television and for performing decryption. It should be understood that the functions performed by various modules of FIG. 3 may be performed using one or more processors. As such, for example, functions of descrambling engine 365 may be performed by control processor 310-1.

Control processor 310-1 may communicate with tuning management processor 310-2. Control processor 310-1 may control the recording of television channels based on timers. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320 and user interface 350. Control processor 310-1 may handle incoming data from network interface 320 and user interface 350. Additionally, control processor 310-1 may be configured to output data via network interface 320.

Control processor 310-1 may include an interface analysis engine 311. Embodiments of a programming disruption analysis engine 311 are described in relation to FIG. 4. The interface analysis engine may be configured to analyze programming streams, or images being displayed on the display devices. The programming streams may be analyzed for thresholds and characteristics correlated with high IR emissions. In some embodiments, programming may include characteristic data. Characteristics of the programming stream may be is inserted into the transport stream as metadata. The disruption analysis engine 311 may use the metadata to predict high IR emissions from the display.

Tuners 315 may include one or more tuners used to tune to transponders that include broadcasts of one or more programming streams or television channels. In the illustrated embodiment of television receiver 300, three tuners are present (tuner 315-1, tuner 315-2, and tuner 315-3). In other embodiments, two or more than three tuners may be present, such as four, six, or eight tuners. Each tuner contained in tuners 315 may be capable of receiving and processing a single transponder stream from a satellite transponder at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 which frequencies are to be tuned to.

In embodiments, tuners 315 that are not used by a user to view programming may be used to analyze the programming stream for threshold and characteristics that have been correlated to high IR field emissions from the display device. Free tuners may be used to analyze programming content in parallel with tuners that may be used to process programming streams for the display device.

Network interface 320 may be used to communicate via an alternate communication channel with a television service provider, if such communication channel is available. The primary communication channel may be via satellite (which may be unidirectional to television receiver 300) and the alternate communication channel (which may be bidirectional) may be via a network, such as the Internet. Referring back to FIG. 2, television receiver 250 may be able to communicate with television service provider system 210 via a network, such as the Internet. This communication may be bidirectional: data may be transmitted from television receiver 250 to television service provider system 210 and from television service provider system 210 to television receiver 250. Referring back to FIG. 3, network interface 320 may be configured to communicate via one or more networks, such as the Internet, to communicate with television service provider system 210 of FIG. 2. Information may be transmitted and/or received via network interface 320. For instance, instructions (e.g., regarding subscription portability) from a television service provider may also be received via network interface 320, if connected with the Internet. Network interface 320 may be used to provide a confirmation to a television service provider that instructions received from the television service provider have indeed been executed.

The network interface 320 may be used by the receiver to transfer IR calibration data to the service provider. The network interface 320 may be used to receive configurations for the IR receiver and remote control from the service provider for the display device model or type that is connected to the television receiver.

Storage medium 325 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to EPG database 330, other non-video/audio data 331, and/or IR configurations 327.

The IR configurations 327 stored in the storage medium 325 may include configuration data and settings for different display device types, for example. The IR configurations 327 may include IR sensor data captured during diagnostics phase which may be transferred to the service provider or analyzed by the television receiver to determine new configurations and settings for the IR receiver.

While a large portion of storage space of storage medium 325 is devoted to storage of television programming, a portion may be devoted to storage of non-audio/video data, such as EPG database 330 and other non-video/audio data 331. The storage medium may include IR configuration data 347 that may include different settings for the IR communication system.

Decoder module 333 may serve to convert encoded video and audio into a format suitable for output to a display device. For instance, Decoder module 333 may receive MPEG video and audio from storage medium 325 or descrambling engine 365 to be output to a television. Decoder module 333 may convert the MPEG video and audio into a format appropriate to be displayed by a television or other form of display device and audio into a format appropriate to be output from speakers, respectively.

Television interface 335 may serve to output a signal to a television (or another form of display device) in a proper format for display of video and playback of audio. As such, television interface 335 may output one or more television channels, stored television programming from storage medium 325 (e.g., television programs from storage medium 325, to a television for presentation.

User interface 350 may include a remote control (physically separate from television receiver 300) and/or one or more buttons on television receiver 300 that allow a user to interact with television receiver 300. User interface 350 may be used to select a television channel for viewing, view information from EPG database 330, and/or program a timer stored to the storage medium 325.

Tuning management processor 310-2 may be in communication with tuners 315 and control processor 310-1. Tuning management processor 310-2 may be configured to receive commands from control processor 310-1. Such commands may indicate when to start/stop recording a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data.

Descrambling engine 365 may use the control words output by smartcard 360 in order to descramble video and/or audio corresponding to television channels for storage and/or presentation. Video and/or audio data contained in the transponder data stream received by tuners 315 may be scrambled. Video and/or audio data may be descrambled by descrambling engine 365 using a particular control word. Which control word output by smartcard 360 to be used for successful descrambling may be indicated by a scramble control identifier present within the data packet containing the scrambled video or audio. Descrambled video and/or audio may be output by descrambling engine 365 to storage medium 325 for storage.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system 800 of FIG. 8.

Figure 4:
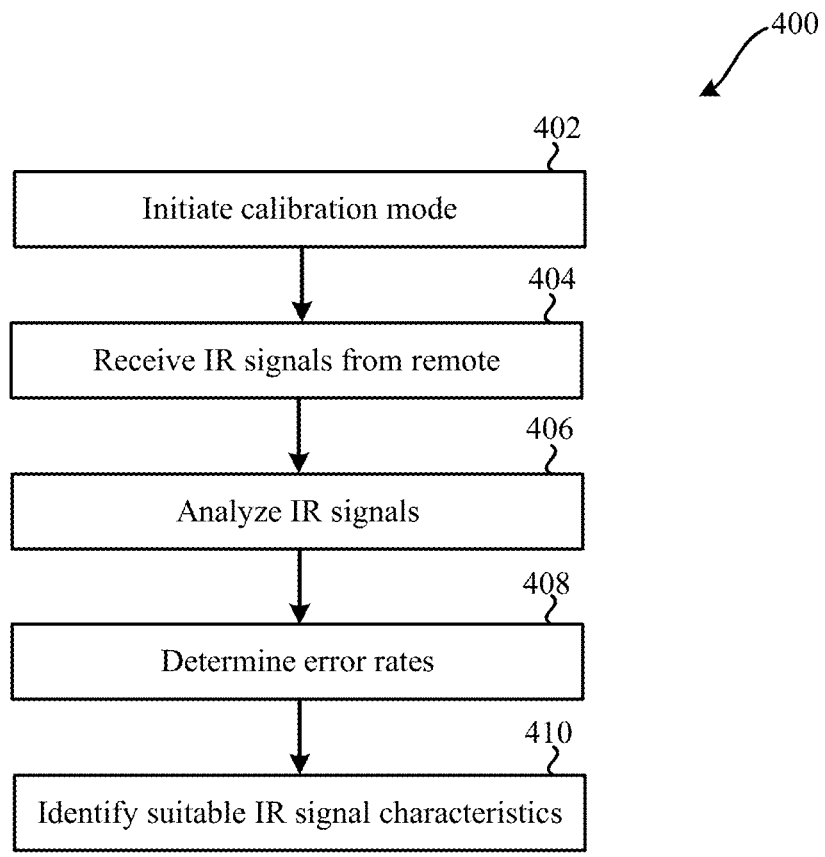
FIG. 4 illustrates an embodiment of a method for determining IR signal characteristics for reliable signaling from a remote control.

FIG. 4 illustrates an embodiment of a method 400 for determining IR signal characteristics. Method 400 may be performed using the systems previously described. For instance, IR communication system 100, satellite television distribution system 200, television receiver 300, FIGS. 1-3, respectively, may be used to perform method 400 Components of such systems may be implemented using hardware, software, and/or firmware. Further, the performance of method 400 may include one or more instances of the components of computer system 800 of FIG. 8.

At step 402, a calibration mode may be initiated. The calibration mode may be initiated by a user. In some embodiments the calibration mode may be initiated when IR signaling becomes unreliable, when a new display device is detected, or may be periodically initiated according to a calibration schedule. The initiation of the calibration mode may cause user prompts to be generated to perform the calibration. The user may be prompted to position the IR remote in its normal working position and orient it towards the STB. The user may be prompted to press one or more buttons on the remote according to the instructions. During the calibration mode, each button press by the user may cause an IR signal to be transmitted to the STB using different IR signal characteristics. One or more commands may be sent from the remote control to the STB using different encoding methods, power levels, signaling schemes, and/or the like. In embodiments, a set of pre-defined commands or test messages may be sent. In step 404, the IR receiver may receive the IR signals from the remote. During the calibration process, the IR receiver may also adjust its operating characteristics. The IR receiver may adjust its sensitivity, receiving frequency, filter settings, and/or other parameters. The transmission of the IR test signals from the remote to the IR receiver may be performed while the display device is showing images, test patters, or video clips. The images, test patterns, or video clips may be configured to stimulate IR emissions from the display device.

At step 406 the received IR signal may be analyzed. The received IR signals may be compared with the expected set of test messages. The error rates and distortions for the signals may be analyzed in step 408. The error rates and distortions to the IR signals may be determined for each different IR signal strength, frequency, and other characteristics adjusted during the sending of the IR test signals.

At step 410, the STB may determine IR characteristics that provide a suitable and reliable IR signaling between the remote control and the STB in the presence of IR emissions from the display device. In some embodiments IR characteristics are chosen that provide reliable signaling at the minimal power level. Power level or intensity of the IR signal may be proportional to the energy required generate the signal. Higher power levels may mean shorter battery lives of the remote control. Likewise, more complex encoding methods that include error control coding may require additional computations that may consume power from the remote control. In embodiments, the STB may evaluate the error rates and energy used to transmit IR signals using the different IR characteristics. The STB may select the IR characteristics that provide suitable error rates but have the lowest energy requirements at the remote control. In some embodiments the minimum power level for reliable IR signaling may be determined and an extra margin of 10% or more may be added to ensure reliable operation.

Figure 5:
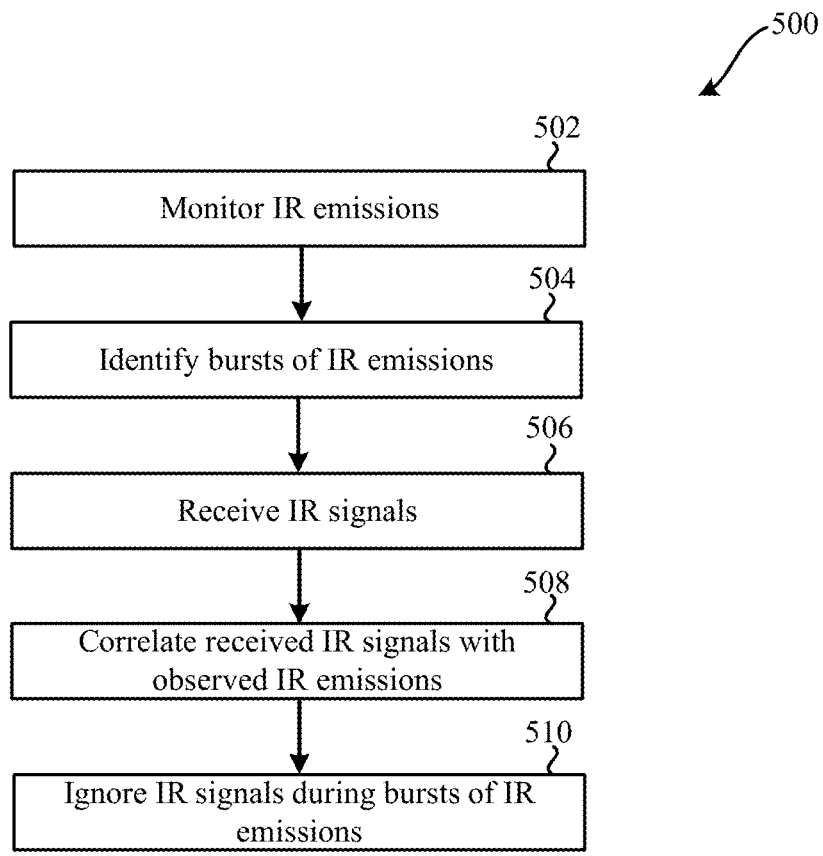
FIG. 5 illustrates an embodiment of a method for determining bursts of IR emissions.

FIG. 5 illustrates an embodiment of a method 500 for determining bursts of IR emissions. Method 500 may be performed using the systems previously described. For instance, IR communication system 100, satellite television distribution system 200, television receiver 300, FIGS. 1-3, respectively, may be used to perform method 500 Components of such systems may be implemented using hardware, software, and/or firmware. Further, the performance of method 500 may include one or more instances of the components of computer system 800 of FIG. 8.

At step 502 the IR emissions from the display device may be monitored. IR sensors at the STB or positioned near the display device may monitor the IR emissions. At step 504 the STB may identify periods of time with bursts of IR emissions or IR emission levels that may disrupt IR signaling from the remote control to the STB. At step 506 the STB may receive IR signals from the remote control. The IR signals may be encoded or based on a repetition protocol in which one message is transmitted two or more times in succession. At step 508, the timing of the IR emission bursts and the timing of the received signals may be correlated to determine which IR signals may have been corrupted by the IR emissions. In step 510 the IR signals that coincided with the measured IR emissions may be discarded. In the case where the IR signaling protocol includes sending multiple copies of the same message, STB may discard the messages that coincided with IR emissions and process the unaffected copies of the messages. When alternative copies of a message are not available the STB may be configured to ignore IR signals that coincide with high IR emissions.

Figure 6:
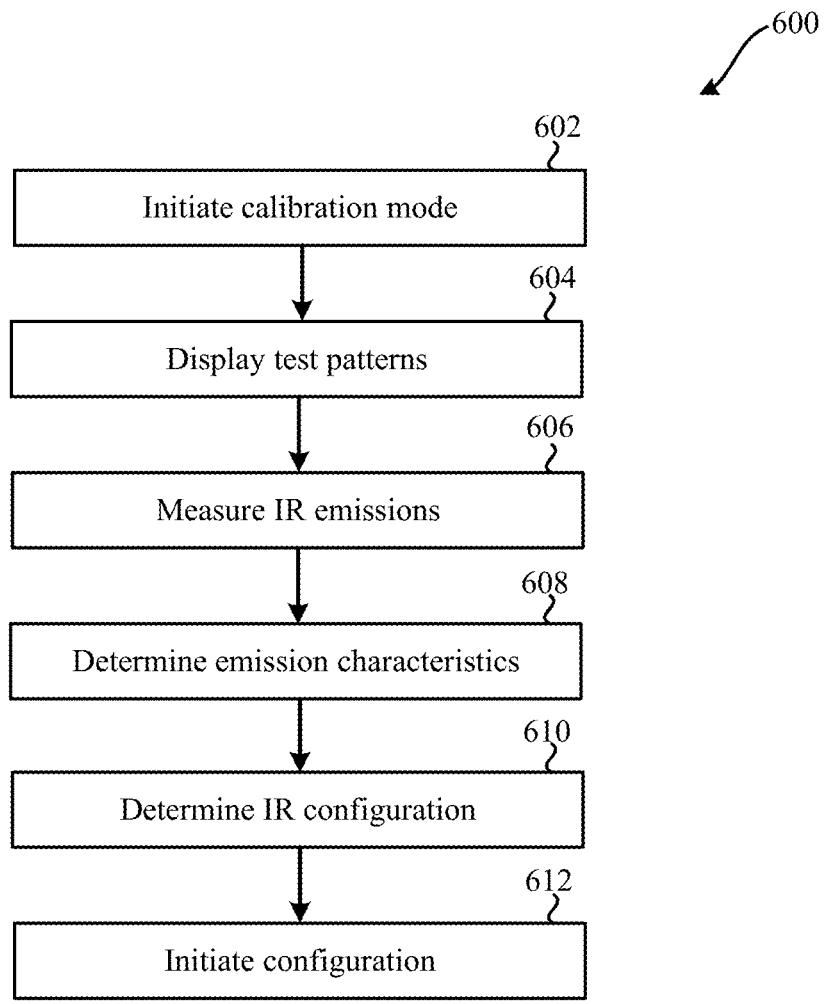
FIG. 6 illustrates an embodiment of a method for determining IR configurations for a display device.

FIG. 6 illustrates an embodiment of a method 600 for determining IR configurations for a display device. Method 600 may be performed using the systems previously described. For instance, IR communication system 100, satellite television distribution system 200, television receiver 300, FIGS. 1-3, respectively, may be used to perform method 600 Components of such systems may be implemented using hardware, software, and/or firmware. Further, the performance of method 600 may include one or more instances of the components of computer system 800 of FIG. 8.

At step 602, a calibration mode may initiated. The calibration mode may be initiated by a user or automatically initiated by the system. Once the calibration mode is initiated, the STB may transmit to the display device a series of test images, patters, or video. The test patterns may be designed to exercise the display with different images of patterns that may generate high IR emissions from the display. The test patterns may include different colors, hues, brightness, motion, and/or the like. The test patterns may be stored in the storage medium of the receiver. In some cases different test patterns may be used for different types or display devices. The test patterns may be designed to generate the worst case IR emission from the display device. In step 606, the IR emission characteristics of the display may be measured during the time when the test patterns are displayed. The IR emissions may be measured by the IR receiver and/or other IR sensors that may be attached or remote to the STB.

At step 608, the IR emission data may be analyzed to determine IR emission characteristics. Characteristics such as the duration of the IR emissions, the frequency, and intensity may influence the parameters of the IR signal encoding or power levels that are used. Based at least in part on the IR emission characteristics the IR configuration data may be selected at step 610. The IR configuration data may include encoding information, power levels, IR receiver configuration, and/or the like. The IR configuration may be loaded from a database of configurations stored on the STB. In some embodiments configurations that match the emission characteristics may be downloaded or received from a service provider. At step 612, the IR configuration may be initiated by the STB. Decoding methods, IR sensitivity, filter settings may be adjusted based on the configuration.

In embodiments, interference mitigation methods and systems may include mechanical means for shielding an IR receiver and/or means for focusing IR signals. In embodiments mechanical means may include one or more mechanical shields, lenses, apertures, and the like to shield the receiver sensor from the display device emissions. Shields, bezels, and the like may be configurable to shield the IR sensor of a television receiver from the IR signal emitted from a television. The bezel around the sensor, for example may be movable or rotatable to adjust the bezel and/or shield relative to the position and orientation of the display device causing the interference.

Figure 7A:
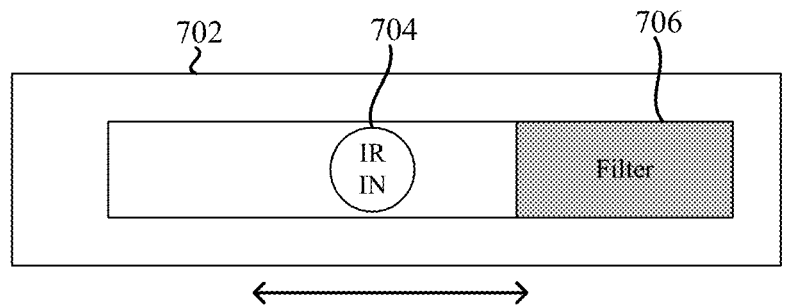
FIGS. 7A-7E illustrate embodiments of sensors with movable filters.
Figure 7B:
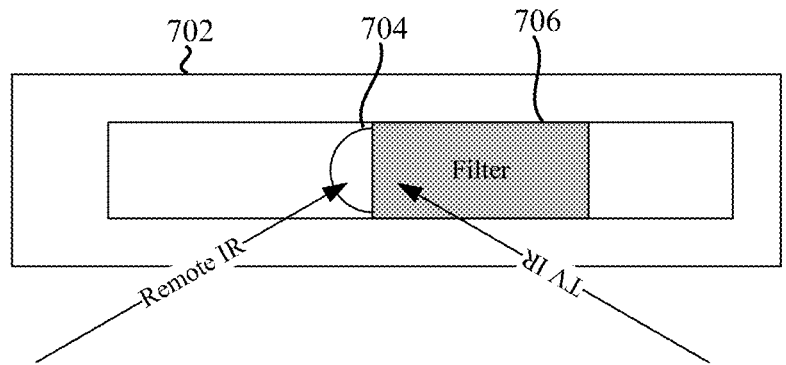
Figure 7C:
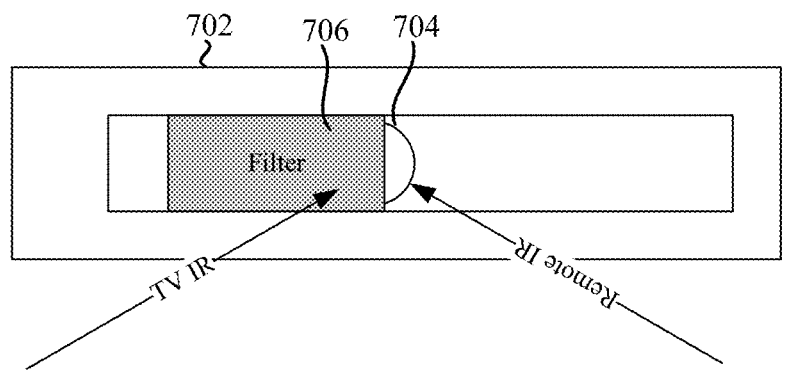

FIGS. 7A-7C depict embodiments of a sensor with a sliding shield or filter. An IR sensor 704 that may be attached or coupled to an STB. The IR sensor 704 may be mounted in a housing 702. The housing 702 may include a sliding filter 706. The sliding filter 706 may be configured to shield the IR sensor 704 from unwanted IR signals. The sliding filter 706 may be of a material that attenuates IR signals. Opaque plastics, metals, and other materials may be used for the filter 706. The sliding filter 706 may be movable along the housing 702. The sliding filter 706 may be configured to be positioned to block the IR sensor 704 from IR signals from one direction while allowing the IR sensor 704 to receive IR signals from another direction. FIG. 7A depicts a configuration where the sliding filter 706 is positioned on the side of the housing 702 such that the filter does not interfere with the IR sensor 704. FIG. 7B depicts a configuration where the sliding filter 706 is configured to partially block the IR sensor 704. The sliding filter 706 is positioned to cover the right side of the IR sensor 704 thereby preventing reception or IR signals from the right side of the sensor 704. The sliding filter 706 may be positioned in this configuration to block signals that may originate from a display that may be located to the right of the sensor 704. FIG. 7C depicts a configuration where the sliding filter 706 is configured to partially block the left side of the IR sensor 704. The sliding filter 706 is positioned to cover the left side of the IR sensor 704 thereby preventing reception or IR signals from the left side of the sensor 704.

Figure 7D:
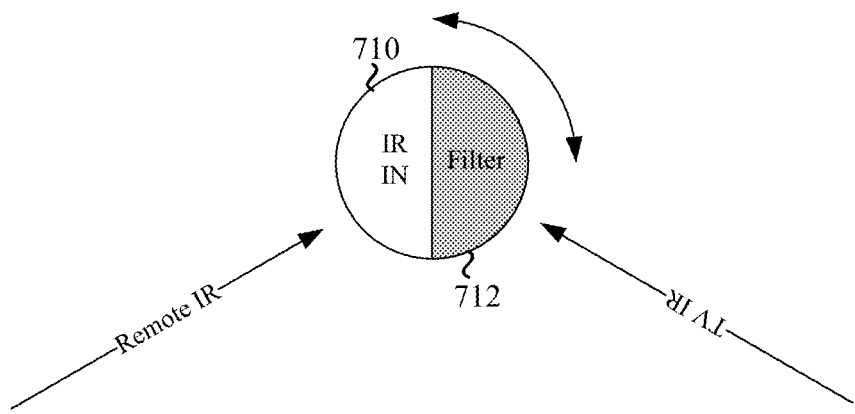
Figure 7E:
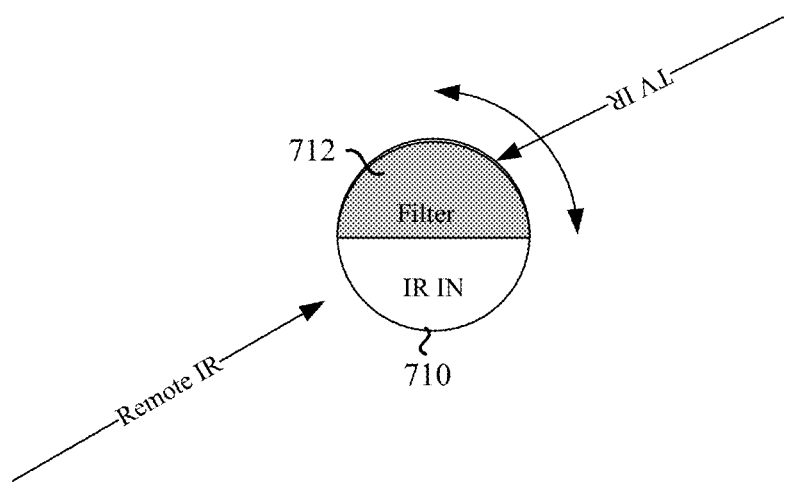

FIGS. 7D-7E depict embodiments of a sensor with a rotating shield or filter. A rotating filter 712 may be configured to shield the IR sensor 710 from unwanted IR signals. The rotating filter 712 may be of a material that attenuates IR signals. The rotating filter 712 may be rotated around the IR sensor 710 to block the IR sensor 710 from IR signals from one direction while allowing the IR sensor 710 to receive IR signals from another direction. FIG. 7D depicts a configuration where the rotating filter 712 is rotated around the sensor to shield the IR sensor 710 from IR signals from the right side of the sensor 710. FIG. 7E depicts a configuration where the rotating filter 712 is rotated around the sensor to shield the IR sensor 710 from IR signals from the top of the sensor 710.

Figure 8A:
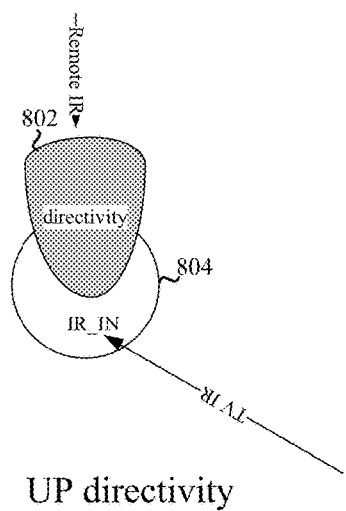
FIGS. 8A-8D illustrate embodiments of sensors with a directivity component.
Figure 8B:
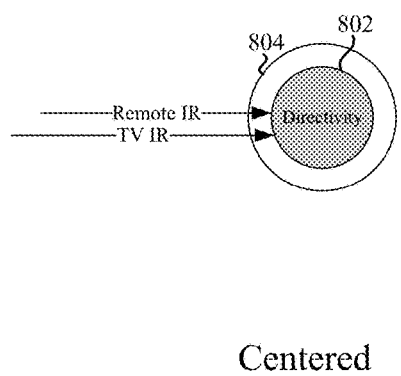
Figure 8C:
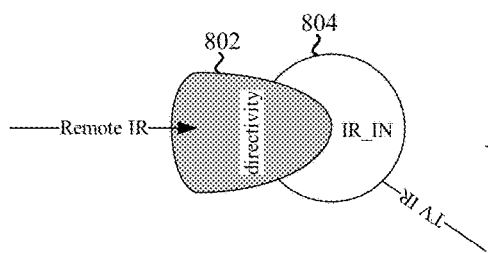
Figure 8D:
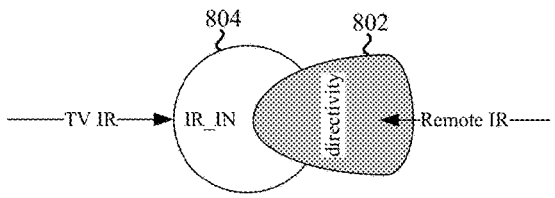

FIGS. 8A-7D depicts an embodiments of an IR sensor with an adjustable directivity. An IR sensor 804 may include a directivity 802 component. The directivity component 802 may be used to direct or focus the input of the sensor to a specific location or side of the sensor. The directivity component 802 may be a movable lens, a light guide, a focusing mirror or the like that may guide IR signals to the IR sensor 804 preferentially from one or more directions. The directivity component 802 may be movable around the sensor 804 and may be positioned to preferentially guide IR signals from a remote and attenuate IR signals from a display. For example the directivity component 802 may be positioned UP as in FIG. 8A to receive remote IR signals from above the sensor 804. The directivity component 802 may be positioned in the center as in FIG. 8B to receive remote IR signals from in front of the sensor 804. The directivity component 802 may be positioned to the left or right as in FIG. 8C and FIG. 8D respectively.

The sliding and rotating filters and the directivity components of FIGS. 7 and 8 may be adjustable by a user. Based on the relative configuration of the display, the remote control, and the IR sensors, the position of the filters and directivity components may be moved to partially cover one side of the IR sensor or direct the sensor toward the remote control. In some embodiments, the user may initiate a calibration routine which may include indicators as to the interference received by the IR sensors or error rates during data transmission from a remote. A user may reposition the filters and directivity components during the calibration and observe the effects of the position on the IR interference and/or error rates.

Figure 9:
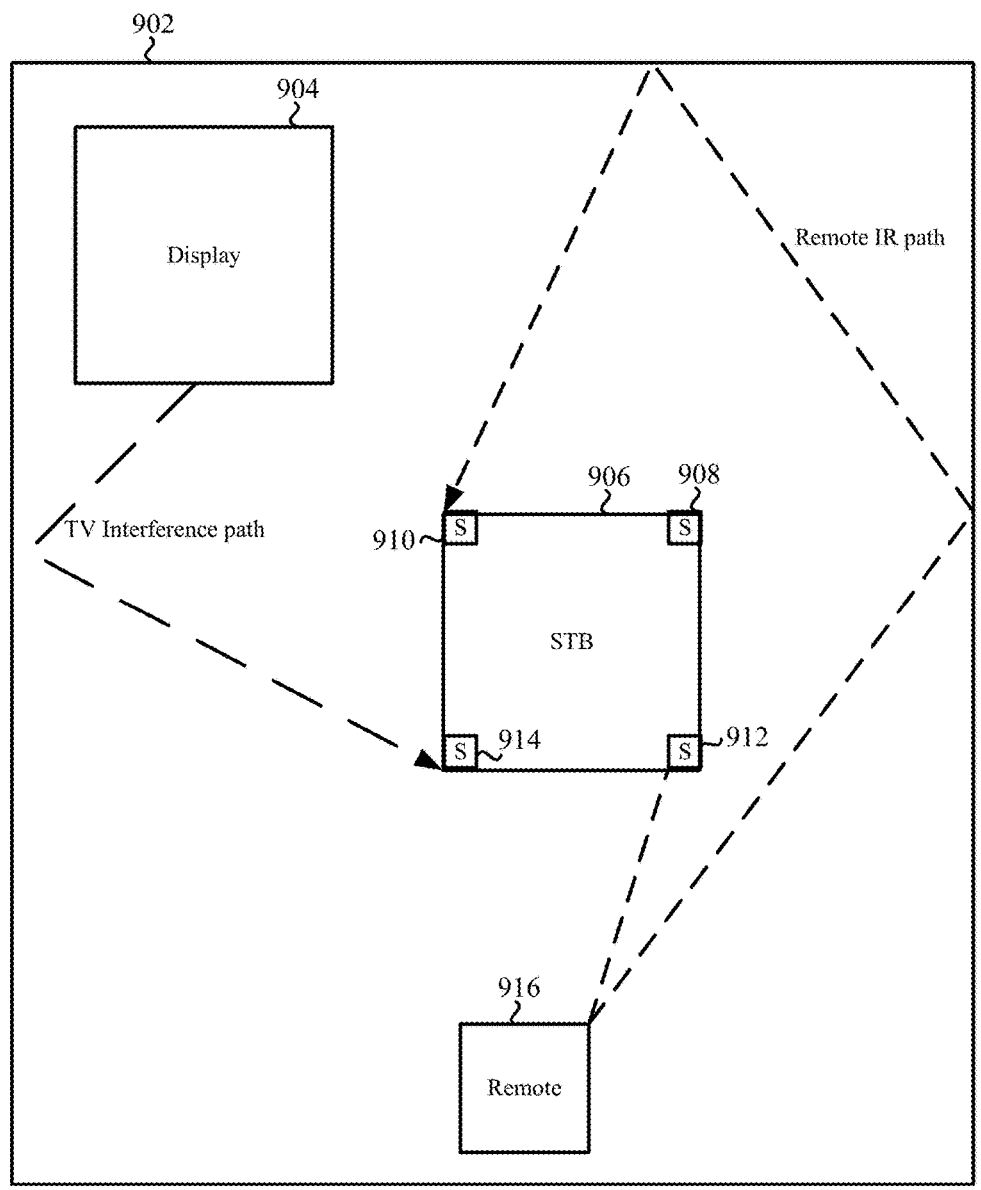
FIG. 9 illustrates an embodiment with multiple IR sensors configured to capture signals from multiple paths from a remote.

FIG. 9 depicts a configuration with multiple IR sensors 908, 910, 912, 914 on a STB 906. Multiple IR sensors may improve the capture of the desired IR signal by receiving IR signals from multiple paths. In many user configurations the IR remote signal path may be indirect as customers may point the remote at the TV rather than the STB. In some configurations the path may be dependent on the location of the user within the room. Multiple sensors may receive signals from multiple paths. IR signals may reflect or bounce from surfaces such as walls and furniture in a room 902. IR signals from a display device 904 may take different paths than signals from a remote 916. The differences in paths may manifest in different reception characteristics at the sensors 908, 910, 912, 914. Sensor reading may be analyzed to identify signals from the remote. In some cases signals from different sensors may be combined to improve signal reception.

Those skilled in the art will appreciate that methods and designs described herein focused on the communication between a remote and an STB, the techniques and designs described are applicable to other devices that utilize IR signaling. Devices such as televisions, stereos, appliances, and the like may utilize or adapt the described techniques and designs.

Figure 10:
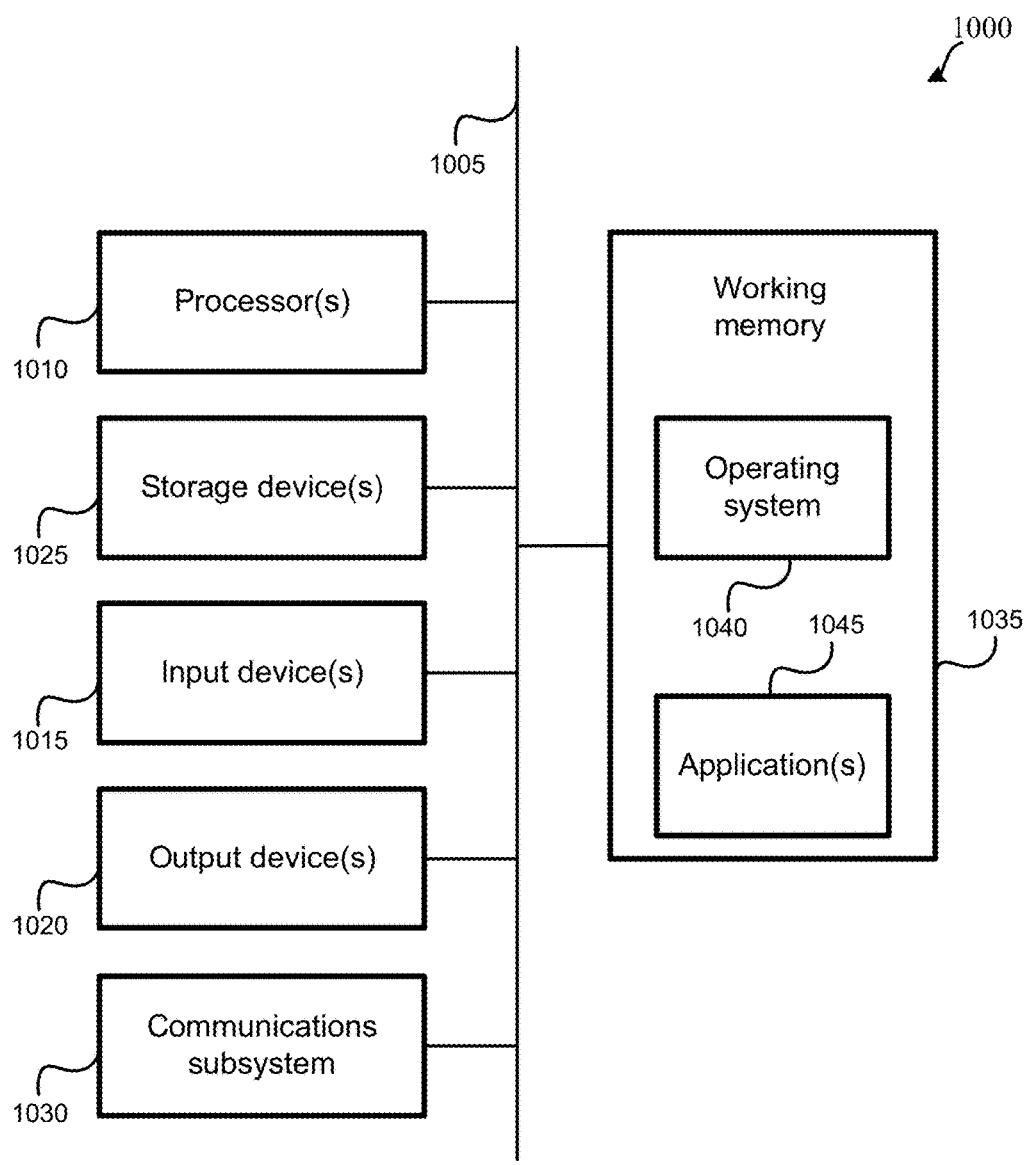
FIG. 10 illustrates an embodiment of a computer system.

A computer system as illustrated in FIG. 10 may be incorporated as part of the previously described computerized devices, such as the described television receivers and television distribution system. FIG. 10 provides a schematic illustration of one embodiment of a computer system 1000 that can perform various steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a keyboard, remote control, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A non-transitory, processor-readable medium for mitigating IR interference from a display device, the non-transitory, processor-readable medium comprising processor-readable instructions configured to cause one or more processors to:
   initiate a calibration mode;
   generate test patterns for display on the display device, the test patterns configured to induce infrared (IR) emissions from the display device;
   measure by a television receiver IR emissions during the display of the test patterns;
   determine IR emission characteristics;
   determine an IR configuration based at least in part based on the IR emission characteristics, the IR configuration comprising settings for IR signaling to mitigate an error rate on received IR signals from an IR remote control caused by the IR emissions, wherein the IR configuration determination further comprises determining for the IR remote control issuing the IR signaling one or more lowest energy requirements at which the error rates on reception are below a threshold;
   adding a margin on energy requirement for the IR remote control of at least 10%; and
   transmitting the IR configuration to the IR remote control via a backchannel communication path.

2. The non-transitory, processor-readable medium of claim 1, wherein the processor-readable instructions cause one or more processors to:
   receive IR signals during the calibration mode, the IR signals processed according to the IR configuration; and
   determine error rates of the IR signals.

3. The non-transitory, processor-readable medium of claim 2, wherein the processor-readable instructions cause one or more processors to:
   adjust the IR configuration to reduce the error rates.

4. The non-transitory, processor-readable medium of claim 1, wherein the processor-readable instructions cause one or more processors to correlate IR emissions with specific patterns displayed on the display device.

5. A method for mitigating IR interference from a display device, the method comprising:
   initiating a calibration mode;
   generating test patterns for display on the display device, the test patterns configured to induce infrared (IR) emissions from the display device;
   measuring by a television receiver IR emissions during the displaying of the test patterns;
   determining IR emission characteristics that cause interference with received IR command signals;
   determining an IR configuration based at least in part based on the IR emission characteristics, the IR configuration comprising settings for IR signaling to mitigate the IR emissions;
   initiating the IR configuration;
   scanning incoming programming content currently being displayed with an inactive tuner, wherein the scanning identifies content with image or video characteristics similar to the test patterns that were determined to cause IR emission characteristics that cause interference with received IR command signals; and
   adjusting the IR configuration to account for the identified content prior to display of the identified content.

6. The method of claim 5, further comprising:
   receiving IR signals during the calibration mode, the IR signals processed according to the IR configuration; and
   determining error rates of the IR signals.

7. The method of claim 6, further comprising adjusting the IR configuration to reduce the error rates.

8. The method of claim 5, wherein the IR configuration comprises IR power level settings.

9. The method of claim 5, wherein the IR configuration comprises IR signal encoding settings.

10. The method of claim 5, further comprising correlating IR emissions with specific patterns displayed on the display device.

11. A television receiver configured to mitigate IR interference from a display device, the television receiver comprising:
    one or more processors;
    a memory communicatively coupled with and readable by the one or more processors and having stored therein processor-readable instructions which, when executed by the one or more processors, cause the one or more processors to:
    initiate a calibration mode comprising transmitting to the display device one or more prompts to a user to transmit one or more commands from an IR remote;
    generate test patterns for display on the display device, the test patterns configured to induce infrared (IR) emissions from the display device;
    measure IR emissions during the display of the test patterns;
    determine IR emission characteristics;
    determine an effect of the IR emission characteristics on received commands from the IR remote;
    determine an IR configuration based at least in part based on the IR emission characteristics, the IR configuration comprising settings for IR signaling to mitigate interference from the IR emissions;
    initiate the IR configuration;
    transmit to the display device one or more additional prompts to a user to re-transmit the one or more commands from the IR remote; and
    verify the IR configuration improves the effect of the IR emission characteristics on the received commands from the IR remote.

12. The television receiver of claim 11, wherein the generated test patterns include multiple images or clips, and wherein the measuring operation further comprises:
    sensing IR emissions with at least one sensor of the television receiver;
    capturing and recording the sensed IR emissions during each image or clip of the multiple images or clips of the generated test patterns; and
    correlating the captured and recorded IR energy to each image or clip of the multiple images or clips of the generated test patterns.

13. The television receiver of claim 12, wherein the processors are further caused to:
    analyze the correlations for each image or clip of the multiple images or clips of the generated test patterns; and determine display conditions that result in high IR emissions from the display device.

14. The television receiver of claim 13, wherein the processors are further caused to assign an available tuner of the television receiver to:
   scan incoming programming to be displayed by the display device for image or video signals that exhibit the determined display conditions that result in IR emissions levels from the display device that disrupt one or more commands from the IR remote;
   identify content with image or video characteristics similar to the determined display conditions that result in high IR emissions from the display device; and
   adjust the IR configuration to account for the identified content prior to display of the identified content.

15. The television receiver of claim 14, wherein the IR configuration determination further comprises:
   determining for the IR remote issuing the IR signaling one or more lowest energy requirements at which error rates on reception of IR signals are below a threshold;
   adding a margin on energy requirement for the IR remote control of at least 10% power; and
   transmitting the IR configuration to the IR remote control via a backchannel communication path.

* * * * *